Feb. 26, 1946. F. D. BRADDON 2,395,447
NON-INDUCTIVE GYRO ROTOR
Filed March 14, 1942 2 Sheets-Sheet 1

INVENTOR,
FREDERICK D. BRADDON,
BY
Herbert P. Thompson
HIS ATTORNEY.

Feb. 26, 1946. F. D. BRADDON 2,395,447
NON-INDUCTIVE GYRO ROTOR
Filed March 14, 1942 2 Sheets-Sheet 2

INVENTOR,
FREDERICK D. BRADDON,
BY
*Herbert D. Thompson*
HIS ATTORNEY.

Patented Feb. 26, 1946

2,395,447

UNITED STATES PATENT OFFICE 2,395,447

NONINDUCTIVE GYRO ROTOR

Frederick D. Braddon, Babylon, N. Y., assignor to Sperry Gyroscope Company, Inc., Brooklyn, N. Y., a corporation of New York Application March 14, 1942, Serial No. 434,771

7 Claims. (Cl. 74—5)

This invention relates to non-conductive or non-inductive gyroscopic rotors for which the principal need is for use in close proximity to a magnetic compass. Instruments requiring the proximate positions of a magnetic compass and gyroscope or other spinning wheels are the gyro stabilized magnetic compass, the earth inductor compass (rotary or flux types) and the gyro magnetic compass.

My invention is equally useful whether the magnetic compass is in the form of the usual pivoted magnetic needle or a form of flux type compass or other earth inductor types. Whenever a spinning wheel of conventional material is placed near any magnetic element, eddy currents are generated in the spinning conductor in the flux field in the magnet. Field distortion and energy absorption results from this phenomena resulting in disturbance of the compass. In fact, a magnetic needle placed near a revolving conductor will be caused to spin with the conductor and therefore become useless as a magnetic compass.

Many attempts have been made to construct gyro rotors of various non-conducting materials but the low specific gravity, the low tensile strength and the poor quality of these materials have prevented the successful use for this purpose.

According to my invention, I propose to retain a heavy metal as the main element of the rotor but to so design the same that eddy currents in all planes is effectively prevented.

Referring to the drawings illustrating my invention,

Fig. 6 is a vertical section of a modified form of stabilized compass.

Figure 5:
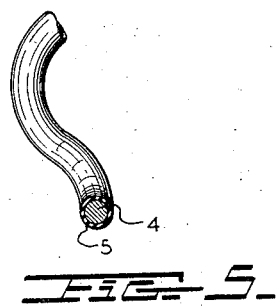
Fig. 5 is a greatly enlarged view of a piece of the wire making up the rotor.
Figure 4:
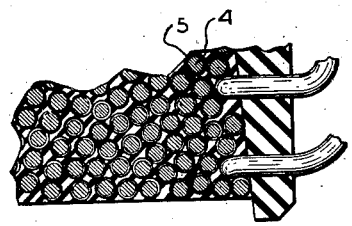
Fig. 4 is an enlarged sectional view of a portion of the rotor.

According to my invention, I place upon the rotor shaft 1, which is preferably of hardened steel, a spool or frame 2 of fabricated non-conducting or plastic material, such as Bakelite. Within the annular recess 3 of this spool, I wind a continuous coil of copper or other heavy metal wire 4 which is preferably enameled as indicated at 5 to insulate each turn from the adjacent convolutions. The two ends of the wire 6 are left disconnected so that current flow within the rotor is limited to the diameter of the wire thus virtually preventing eddy currents in any direction. The ends of the wire may be anchored in the frame as shown in Fig. 5. The wire is wound closely together, and to maintain balance and strength, the spaces between the wire impregnated with suitable plastic material such as Bakelite varnish, which is preferably baked after being applied. This bonds the wires of the coil together. The spool or frame is shown as of substantial thickness at one end in the periphery of which I provide serrations 8, thus providing teeth or buckets for the interception of a spinning jet or jets from one or more nozzles 10. It is also shown as having an outwardly tapering channel. This not only gives a greater strength to the walls of the spool near their base where the strain is greater but also permits the wire annulus to become thicker toward the rim or periphery where the increased mass is more effective in increasing the moment of inertia of the rotor.

Figure 1:
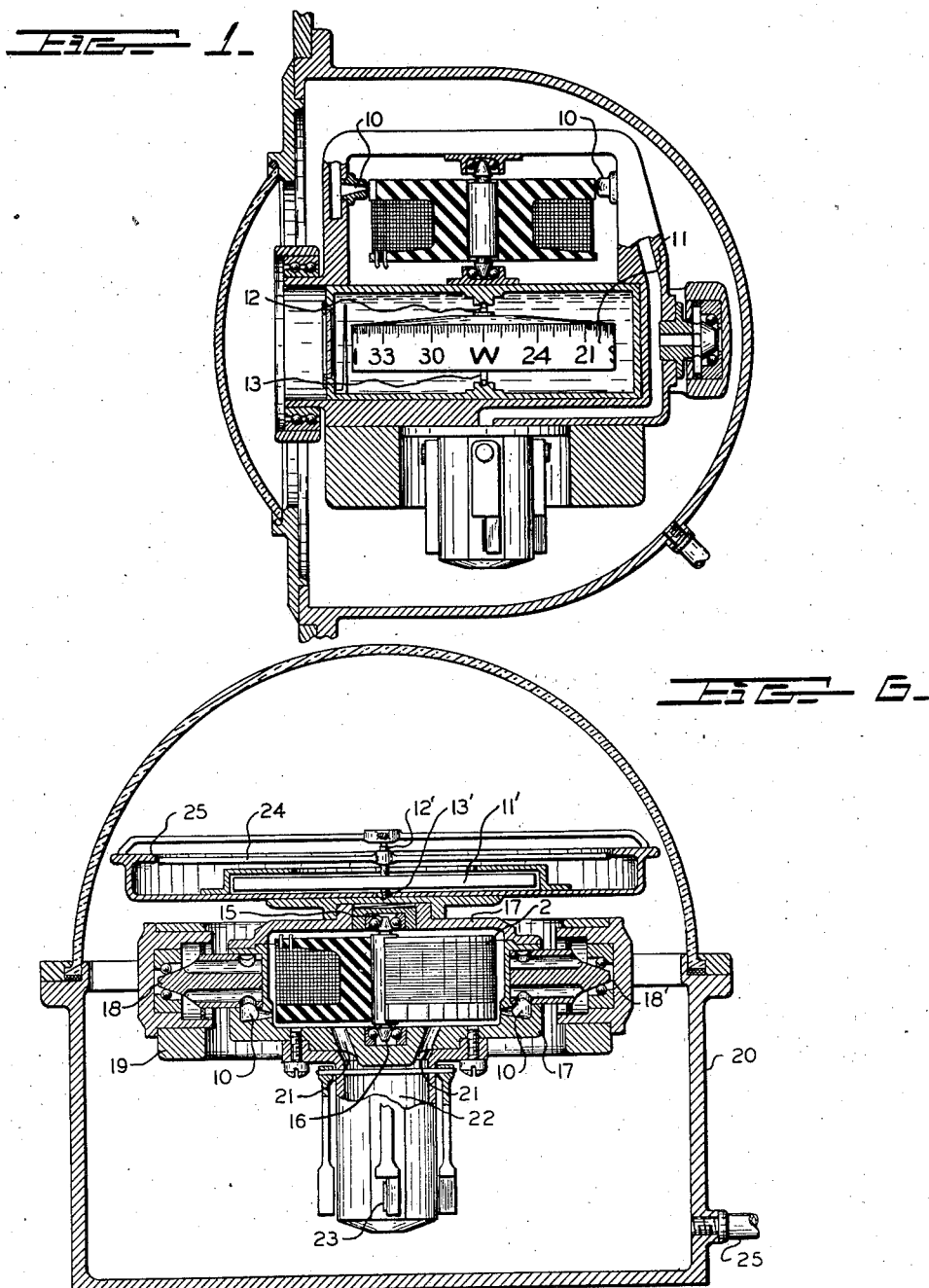
Fig. 1 is a view showing my improved rotor employed on a stabilized magnetic compass.
Figures 2, 3:
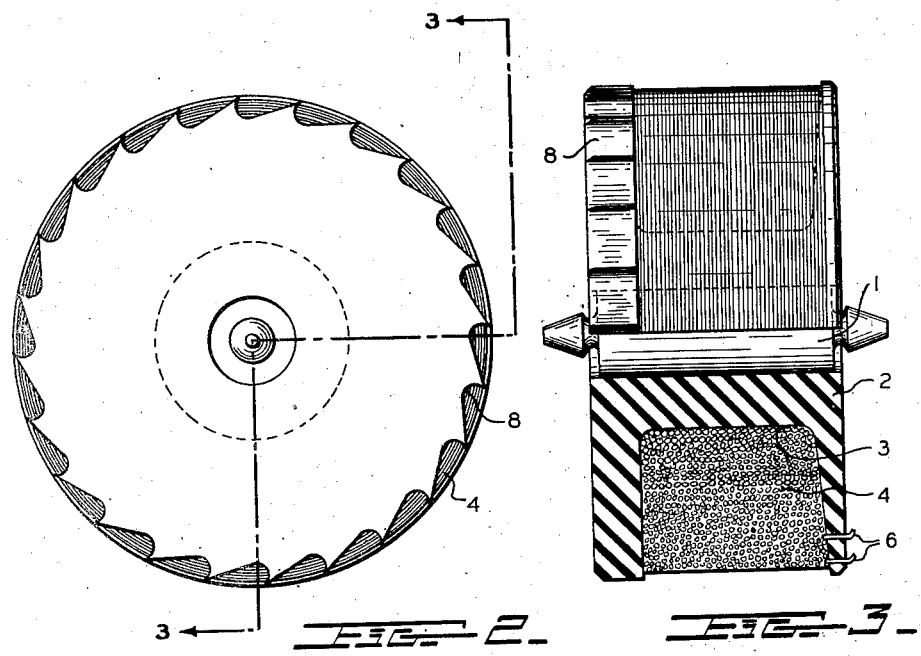
Fig. 2 is a side elevation of the rotor.
Fig. 3 is a face view of the same, partly in section; taken on broken line 3—3 of Fig. 1.

In Fig. 1 the rotor is shown as forming the gyro rotor of a gyroscopic stabilizer or artificial horizon which stabilizes the magnetic compass 11 pivoted therein on upper and lower vertical pivots 12 and 13, the design selected for illustration being similar to that shown in the prior patent to Elmer A. Sperry, No. 1,993,864, dated February 24, 1932. It is obvious, however, that my rotor design is adapted for any type of magnetic compass-gyroscope combination including gyro magnetic compasses, stabilized flux valve compasses, etc., as above pointed out. In my improved rotor design, the net density is much greater than the heaviest glass or other non-conductor and the heavier portion is near the rim and the lighter portion near the center whereby a high moment of inertia is obtained.

Where a small exceptionally high efficiency rotor is desired, I may employ a high density metal such as tungsten wire instead of copper, or other ordinary insulated wire. Such a rotor would not only have a high moment of inertia, but would have a much greater factor of safety than a cast metal rotor or one made of powdered tungsten or the like, drawn tungsten wire having a greater tensile strength.

My improved rotor is shown in Fig. 6 as incorporated in a stabilized magnetic compass of the top reading type. In this figure the rotor 2 is mounted for spinning about a vertical axis in pivots 15, 16 within the rotor bearing case 17 which in turn is mounted for oscillation about a horizontal axis on trunnions 18, 18' in bearings within the gimbal ring 19. The gimbal ring is pivoted for oscillation about a horizontal axis at right angles to axis 18—18 within the outer frame 20 by means of pivots, not shown. Air is withdrawn from the outer casing 20 through pipe 25 and the atmospheric air is introduced through said hollow trunnions, including trunnions 18, 18', to supply air to the spinning jets 10, as before, and the exhaust air led down through apertures 21 into the hollow extension 22 from whence it emerges through gravitationally controlled ports 23 to erect the gyroscope, as well understood in the art. On top of the casing 17 is pivoted in upper and lower pivots 12' and 13' a magnetic needle 11' and on the pivot pin of the needle I mount a compass indicator which may be in the form of a pointer 24 readable upon an angular card 25. By virtue of my improved rotor, the compass needle may be mounted directly over the rotor without causing disturbance of the needle.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyroscopic rotor comprising a spool of insulating material having an annular depression and a winding of insulated open-circuited wire substantially filling said depression.

2. A gyroscopic rotor comprising a spool of insulating material having an annular depression, a serrated rim, and a winding of insulated open-circuited wire substantially filling said depression.

3. A non-inductive gyro rotor comprising a spool of electrically non-conductive material whose axis is the spin axis of the rotor, said spool having a winding secured between the rims thereof in the form of an electrically conductive, insulated wire with open ends.

4. A gyro rotor as claimed in claim 3, in which one of the rims of the rotor spool is circumferentially serrated.

5. A gyroscopic rotor as claimed in claim 1, in which at least one wall of said spool is internally tapered so that it is thicker near the center than at the rim.

6. A gyro rotor structure comprising a shaft, an open-circuited, insulated wire wound to provide a coil shaped generally in the form of a hollow circular cylinder with the wire bonded together to form a unitary mass, said coil being mounted on said shaft with the longitudinal axis of the coil and the axis of the shaft in coincidence.

7. A gyro rotor structure comprising a shaft, a spool mounted on said shaft, and an open-circuited, insulated wire wound on said spool to provide a coil shaped generally in the form of a hollow circular cylinder arranged in concentric relation to the axis of the shaft.

FREDERICK D. BRADDON.